Patented July 17, 1928.

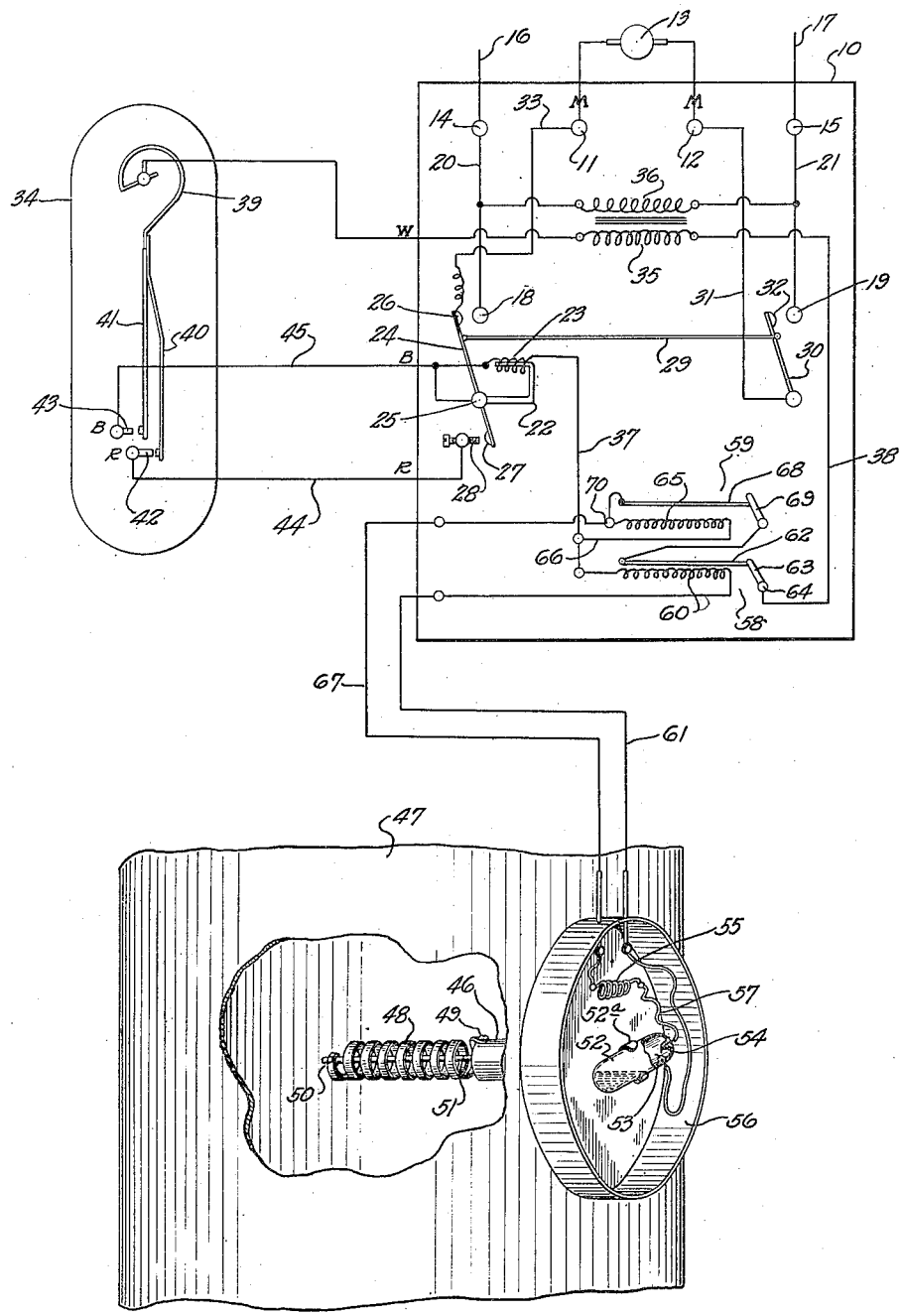

1,677,295

UNITED STATES PATENT OFFICE.

HOMER S. ROGERS AND RICHARD RADDATZ, OF MILWAUKEE, WISCONSIN, ASSIGNORS TO COMBUSTION FUEL OIL BURNER COMPANY, OF MILWAUKEE, WISCONSIN, A CORPORATION OF WISCONSIN.

AUTOMATIC SAFETY CONTROL FOR OIL BURNERS.

Application filed May 17, 1926. Serial No. 109,592.

This invention relates to improvements in automatic safety controls for oil burners.

Oil burning systems such as are used for heating homes and the like comprise in general a motor for supplying oil and atomizing air to the burner, a control relay for the motor, and a thermostat or what is sometimes referred to as a mechanical thermometer for automatically controlling the operation of the relay to maintain the room temperature substantially constant. For the purpose of providing against continued operation of the motor in the event of failure of the oil to ignite, or in the event of failure after ignition, it has been proposed to place a thermostatic safety switch in the relay circuit and to mount this switch where it will be subject and responsive to the heat resulting from combustion at the burner. This switch has been mounted adjacent the burner in some systems while in others it has been placed in the stack or flue. The arrangement, generally, is such that in the event of failure of ignition at the burner and consequent failure of the heat responsive element forming part of the thermostatic safety switch to heat up or remain heated, as the case may be, the latter will assume either a closed or open position to cause opening of the relay circuit and consequent opening of the motor circuit to stop the supply of oil and air to the burner.

This safety means or thermostatic switch for providing against continued operation of the motor in the event of failure of ignition at the burner naturally depends for its functioning upon its being properly connected in the relay circuit at the time of installation of the system and at all other times, and while these systems are often installed by experienced operators, it is very easy to so connect the various parts that the thermostatic safety switch will be entirely ineffective in controlling the relay in the event of failure of ignition at the burner. It is also possible, of course, for a short circuit to occur in the safety switch circuit after installation. In either of such events the "stack" or "flame safety," as these controls are termed, would be rendered ineffective, and as these safeties control the system independently of the various other controls and, therefore, have no effect upon the normal operation of the system, the attendant or householder is without knowledge as to whether this additional feature of safety is in proper working order or not.

One of the objects of the present invention, therefore, is to provide, in a system of the character referred to, means for operating the relay to open the motor circuit in the event of either a break in the safety switch circuit or a short circuit or other misconnection, thereby making it necessary that the safety switch be properly installed and in proper working condition at all times as a prerequisite to operation of the system.

Other objects and advantages will hereinafter appear.

For the purpose of illustrating the invention, one embodiment thereof is shown in the drawing, the latter showing diagrammatically the usual electrical connection of an oil burning system of the character referred to with the improved safety means embodied therein, the thermostatic safety switch being shown in perspective with some of the parts broken away and removed for the sake of clearness.

The relay unit, designated generally by the reference numeral 10, is provided with binding posts 11 and 12 across which the motor 13 is connected, as shown, binding posts 14 and 15 to which the supply lines 16 and 17 are connected, and contacts 18 and 19 to which the binding posts 14 and 15 are connected by means of connections 20 and 21, respectively. For the purpose of connecting motor 13 directly across the supply lines, the relay unit 10 is provided with the electro-magnetic switch 22, the latter being provided with the energizing coil 23 and the armature 24 pivotally mounted at 25 and provided at one end thereof with contact 26 suitably insulated therefrom and arranged to engage contact 18 and at the other end with contact 27 arranged to engage the adjustable contact 28 for the purpose hereinafter explained, armature 24 being mechanically connected by means of a suitable link 29 to a switch arm 30 connected to the motor post 12 by the connection 31 and provided at its free end with a contact 32 arranged to engage contact 19. The other motor binding post 11 is connected by means of a conductor 33 to contact 26. As contacts 26 and 27 are interposed respectively in high and low tension lines, as will hereinafter more fully appear, they are suitably insulated one from the other.

From the foregoing it will be seen that when coil 23 is excited arms 24 and 30 will be moved to the right to connect contacts 26 and 32 with contacts 18 and 19, respectively, thus connecting motor 13 directly across the supply line 16—17, the motor acting in the usual manner to supply oil and atomizing air to the burner. It will be seen, further, that the closing of the motor switch comprising arms 24 and 30 depends upon completion of the circuit in which the energizing coil 23 is connected and that upon breaking or opening of this circuit coil 23 will be deenergized whereupon armature 24 drops back either by gravity or spring action, thus breaking the motor circuit.

It is therefore possible to maintain the temperature of any room substantially constant by providing means for automatically opening this coil circuit when the room temperature rises slightly above the point desired and automatically closing the coil circuit when the room temperature falls slightly below such point, and to this end a room thermostat or so-called mechanical thermometer of the usual construction and designated generally by the reference numeral 34 is placed in circuit with the exciting coil 23 and the secondary 35 of a transformer having its primary 36 connected directly across the supply line 16—17 as shown, the circuit comprising secondary 35, thermostat 34 and coil 23 being completed through connections 37 and 38 and means hereinafter described and which constitute the present improvement.

The thermostat 34 comprises, in general, the heat-responsive element 39 and the contact arms 40 and 41 secured thereto and having their respective free ends arranged to engage with contacts 42 and 43, respectively. Contact 42 is connected by means of connection 44 to the adjustable contact 28, while contact 43 is connected by means of connection 45 to one end of coil 23, conductor 37 being connected to and extending from the other end of said coil. The arrangement is such that as the room temperature falls, the heat-responsive element 39 will move arms 40 and 41 to the left to first cause contact of the end of arm 40 with contact 42 and thereafter causing contact of the end of arm 41 with contact 43, thus completing the circuit of coil 23 and causing the motor switch to close in the manner explained above. In this connection it is to be noted that upon engagement or connection of arm 40 with contact 42 the coil circuit will still be open for the reason that contact 27 will be out of engagement with contact 28, but that upon engagement of arm 41 with contact 43 the coil circuit will be completed to cause movement of arms 24 and 30 to the right and engagement of contacts 27 and 28. This engagement of these latter contacts maintains the coil circuit upon subsequent disengagement of arm 41 and contact 43 as the room temperature rises, and during the interval which elapses between such disengagement and the disengagement of arm 40 and contact 42. Movement of arm 40 out of engagement with its associated contact 42 opens the circuit of coil 23 and thus causes opening of the motor switch. The purpose of the transformer comprising coils 35 and 36 is to materially decrease the voltage impressed upon the circuit of coil 23 to prevent excessive sparking at contacts 42 and 43 upon disengagement therewith of arms 40 and 41 and to avoid the necessity of running high tension wires up to the upper floors where the thermostat 34 is usually installed.

The thermostatic safety switch unit referred to is designated generally by the reference numeral 46, and is shown as being mounted in the stack or flue 47 with the heat-responsive element 48 of this unit extending into the flue where it will be subject to heat developed at the burner upon ignition of the oil. One end of element 48 is fixed at 49 to a stationary part of the unit, while the other end is fixed at 50 to the outer end of a rod 51 which is connected at its other end to a suitable mercury or other switch 52 housed within a casing or the like 56 exteriorly of the flue. Rod 51 is rotatably mounted so that upon heating up of element 48, said rod is turned, thus tilting switch 52 and causing the electrodes 53 and 54 thereof to be bridged by the mercury.

The arrangement therefore is such that if the oil fails to ignite when the motor is thrown on element 48 will be uninfluenced and switch 52 will remain in circuit breaking position. On the other hand, should the oil ignite and the heat thereof cause the switch to move into circuit making position and thereafter the flame, for some reason or other, be extinguished or fail, it will be observed that element 48 will quickly cool and tilt the switch 52 back to its circuit breaking position. It is desirable that the switch 52, or more epecially its holding bracket or clip 52ª, be frictionally connected or secured to the adjacent end of rod 51 so that the tilting movement imparted to the switch may be restricted without restricting the turning movement of the rod 51 and to this end a coiled spring (not shown) may be interposed between the switch bracket and adjacent end of the rod, providing a normal operative connection but permitting slippage between said parts in either direction once the movement of the bracket has been arrested.

According to the present invention it is contemplated to connect the safety switch in series with the relay circuit and to interpose two thermal cutout devices of varying current-carrying capacities and a balancing resistance for the cutout device of lowest capacity, said balancing resistance, said switch and the heating element of the last-mentioned cutout device being connected in series with each other and in parallel with the heating element of the other cutout device, the circuit making elements of said cutout devices being connected in series in the relay circuit. In the drawings, the thermal cutout devices are designated generally by reference numerals 58 and 59. For convenience, these devices may be mounted directly in the usual housing employed for enclosing the relay and its associated parts, although of course these devices may be mounted or arranged in the system at other locations if desired. These thermal switch or cutout devices are of well-known construction and are merely shown diagrammatically in the drawings. Referring to thermal switch device 58, the same comprises, briefly, a heating coil 60 connected at one end thereof to electrode 53 of the safety switch 52 by means of conductor 61, a thermostatic bi-metallic strip 62 and a switch 63 to which connection 38 is secured at 64. As is well known, the construction of this device and the arrangement of its parts are such that the heat of coil 60, in the event the latter be made to carry current over and above the amount which it carries in the normal operation of the system, causes upward flexing of the bi-metallic strip 62, thus permitting switch 63 to drop either by gravity or spring action to open position.

The construction and operation of the thermal switch device 59 is the same as that explained in connection with device 58, device 59 comprising the heating coil 65 connected at one end to conductor 37 by means of the connection 66 and at its other end to electrode 54 of switch 52 through conductors 67—57 and interposed resistance coil or element 55, the thermostatic bi-metallic strip 68 and the switch 69 being connected in series with switch 63, as shown, the strip 68 being connected at 70 to conductor 67.

From the foregoing it will be seen that upon opening of either of the switches 63 or 69, the circuit of coil 23 will be opened to cause opening of the motor switch in the manner explained above and independently of the room thermostat 34. The resistance or heating coil 60 is equal substantially to that of the coil or element 55, the combined resistance of coils 60 and 55 being equal substantially to the resistance of heating coil 65. The resistance of coil 23 is equal substantially to that of coil 65. While these values have been found to provide for satisfactory operation, they may of course be varied to some extent without departing from the spirit or scope of the invention.

It is to be noted that, as shown and as above described, the heating coil 60 of thermal switch 58, switch 52 and resistance coil 55 are connected in series with each other in the relay circuit, while heating coil 65 of thermal switch 59 is connected in the circuit in parallel with the series connected devices just named. The resistance coil 55, therefore, acts merely as a balancing resistance for the resistance coil 60 of thermal switch 58, these two resistances, as above explained, being equal substantially to that of the heating coil 65. During the normal operation of the system, the current divides at the point 70, one-half going through the series comprising the balancing coil 55, switch 52 and the heating coil 60, while the other half goes through heating coil 65, connected as explained in parallel with said series.

The operation of the improved safety circuit is as follows: As the room temperature falls below the point at which the room thermostat 34 has been set, the latter will operate in the manner explained above to complete the circuit through coil 23, through switches 63 and 69 and the heating coil 65, this coil at this time taking the entire amount of the current for the reason that the heat responsive element in the stack will not have as yet been heated up sufficiently to effect closing of switch 52, which latter switch is connected in series with the heating coil 60 and completes the circuit in which the same is connected. When motor 13 is started, therefore, the heating coil 65 will carry an amount of current sufficient to cause heating and upward flexing of the bi-metallic strip 68 associated therewith in the event switch 52 is not moved to circuit making position within a given time interval after the motor is started. Element 48 is made quite sensitive so that switch 52 is tilted to close the circuit quite promptly following ignition at the burner. In constructing the thermal switch device 59, this time interval required to operate switch 52 is taken into account and the parts so arranged that the heat of the coil will not cause the switch device to throw out until after the elapse of a period of time ample for the operation of switch 52. As soon as switch 52 is closed, the amount of current passing through heating coil 65 is reduced one-half, since one-half of the current then passes through the series comprising resistance element 55, switch 52 and the heating coil 60. If ignition at the burner fails when heat is called for by the thermostat 34, of course the element 48 will not operate to close switch 52, so that the entire amount of current will then pass through heating coil 65 for a sufficient length of time to cause upward flexing of strip 68 to open switch 69, thus opening the circuit of coil 23 and causing opening of the motor switch.

Should there be a failure of ignition or combustion at the burner after it has initially taken place, the element 48 would quickly cool, thus rocking the switch 52 to circuit breaking position and throwing the entire current into the coil 65, resulting in a similar action and the opening of the motor circuit. If at the time of installation, or after, conductors 61 and 67 should be cut or broken so as to disconnect the thermostatic safety switch unit, a similar result would follow, namely, the entire current would be thrown into coil 65, resulting in the opening of switch 69 and the motor circuit. If the thermostatic safety switch unit 46 is not properly connected in installing the system, as for instance if conductors 61 and 67 should be simply crossed, thus short-circuiting the switch 52 and resistance element 55 out of the circuit, an amount of current will pass through coil 60 equal to substantially twice that it is required to take under normal operation, and the switch is so designed that with this amount of current the coil will heat up sufficiently to flex strip 62 upwardly, thus opening switch 63, this acting, as will be apparent, to break the circuit of coil 23 and thus cause the motor switch to open.

It will thus be seen that thermal safety or switch device 59 opens the relay circuit in the event of failure of combustion at the burner, either initially or after once started, and that said switch device 59 also acts to open the relay circuit in the event the connections with the thermostatic safety switch unit should be broken or disrupted, while device 58 acts to open the relay circuit in the event of a short circuit across conductors 61 or 67, either at the time of installation or subsequently thereto, these devices acting independently of the room thermostat and making it necessary that the safety switch be properly installed and in proper working condition at all times as a prerequisite to operation of the system.

While one embodiment of the invention has been shown and described, various changes of course may be made without departing from the spirit of the invention or the scope of the claims.

The invention claimed is:

1. In an oil burner system of the character described, the combination with the motor and controlling relay circuit thereof, of a switch, a heat-responsive element subject to the heat of the burner associated with said switch for operating the same, and a pair of thermal switch devices interposed between said relay and said switch and each comprising a heating coil and a switch controlled thereby, one of said devices being responsive to effect opening of the relay circuit upon the existence of a condition of non-combustion at the burner, the other of said devices being responsive to effect opening of the relay circuit in the event of a short-circuit of said first-named switch and its associated connections.

2. The combination with the relay circuit of an oil burning system, of means interposed in said circuit for automatically rendering the same inoperative upon the existence of certain conditions, said means comprising a switch operable by conditions of combustion and non-combustion at the burner, a plurality of resistance units connected in the circuit in series with said switch, another resistance unit connected in the circuit in parallel with respect to said series connected units and switch whereby when said switch is closed the current passes through all of said units but when open the entire current passes through said last-named resistance unit, and a thermal cutout operable by the heat developed in said last-named resistance unit under the condition last recited.

3. The combination with the relay circuit of an oil burning system, of means interposed in said circuit for automatically rendering the same inoperative upon the existence of certain conditions, said means comprising a switch operable by conditions of combustion and non-combustion at the burner, a plurality of resistance units connected in the circuit in series with said switch, another resistance unit connected in the circuit in parallel with respect to said series connected units and switch whereby when said switch is closed the current passes through all of said units but when open the entire current passes through said last-named resistance unit, a thermal cutout operable by the heat developed in said last-named resistance unit under the condition last recited, the combined resistance of said series connected units being substantially equal to the resistance of said last-named unit, and a thermal cutout associated with one of said series connected units operable by the heat developed in the latter in the event it should be made to carry more than its normal share of the current.

4. The combination with the relay circuit of an oil burning system, of a safety switch connected in series with said circuit, a plurality of thermal cutout devices of varying current carrying capacities associated in said circuit, and each comprising a heating coil and a thermal switch, a balancing resistance unit for the cutout device of lowest resistance also connected in said circuit, said balancing resistance, said safety switch and the heating coil of the last-named cutout device being connected in series with each other and in parallel with the heating coil of the other cutout device.

5. The combination with the relay circuit of an oil burning system, of a safety switch connected in series with said circuit, a plurality of thermal cutout devices of varying current carrying capacities associated in said circuit and each comprising a heating coil and a thermal switch, a balancing resistance unit for the cutout device of lowest resistance also connected in said circuit, said balancing resistance, said safety switch and the heating coil of the last-named cutout device being connected in series with each other and in parallel with the heating coil of the other cutout device, the resistance of the coil of said lowest capacity cutout and that of said balancing resistance being substantially equal one to the other and together substantially equal to the resistance of the coil of the other of said cutouts.

6. In a system of the character described, the combination with the motor switch operating coil and the thermostatic flame-safety switch thereof, of a pair of thermal devices each comprising a heating coil and a switch controlled thereby, said thermal switches being connected in series with each other and with said first-named coil whereby opening of either switch opens the coil circuit, and a resistance element connected in series with said flame-safety switch and said thermal switches and one of said heating coils, the other of said heating coils being connected in parallel with the series comprising said last-named heating coil, resistance element and said flame-safety switch whereby opening of the latter causes heating up of said other heating coil to a point effecting opening of the thermal switch associated with the latter and whereby short-circuiting of the series comprising said resistance element and said flame-safety switch causes heating up of said first-named heating coil to effect opening of the other thermal switch associated with the latter.

7. In a system of the character described, the combination with the motor switch operating coil and the thermostatic flame-safety switch thereof, of a first thermal switch device connected in series with said coil for controlling the flow of current thereto and being operable to open position upon opening of said flame-safety switch, and a second thermal switch device electrically interlocked with said first device and also connected in series with said coil for controlling the flow of current thereto and being operable to open position upon short-circuiting of the flame-safety switch circuit.

8. The combination with the relay circuit of an oil burning system, of means interposed in said circuit for automatically rendering the system inoperative upon the existence of certain conditions therein, said means comprising a switch operable by conditions of combustion and non-combustion at the burner, a thermal device comprising a heating coil and a circuit-making element controlled thereby, a second thermal device comprising a heating coil and a circuit-making element controlled thereby, and a resistance unit, said elements and said switch and said resistance unit and said first heating coil being connected in series, said second heating coil being connected in parallel with the series comprising said first heating coil, said resistance unit and said switch.

9. The combination with the relay circuit of an oil burning system, of means interposed in said circuit for automatically rendering the system inoperative upon the existence of certain conditions therein, said means comprising a switch operable by conditions of combustion and non-combustion at the burner, a thermal device comprising a heating coil and a circuit-making element controlled thereby, a second thermal device comprising a heating coil and a circuit-making element controlled thereby, and a resistance unit, said elements and said switch and said resistance unit and said first heating coil being connected in series, said second heating coil being connected in parallel with the series comprising said first heating coil and said resistance unit and said switch, the respective resistances of said first heating coil and said resistance unit being substantially equal and their sum being equal substantially to the resistance of said second heating coil.

10. In an oil burning system of the character described having a burner and a motor, a controlling switch for said motor operable by conditions of combustion or non-combustion at the burner, and a plurality of thermal cut-outs interposed in the switch circuit, one of said cut-outs being operable upon failure of combustion at the burner or in the event said switch is not connected in the circuit, another of said cut-outs being operable in the event of a short-circuit or other misconnection in the switch circuit.

11. An automatic safety control for oil burners comprising a current source, a motor, a relay interposed between the motor and the current source and including an electro-magnetic switch regulating the connection and disconnection of the motor with the current source, a thermostatic switch connected in series with the windings of the electromagnetic switch and controlling the operation of the same, a time-limit cut-out including a thermal switch and a heating element operatively associated with the thermal switch, said thermal switch and said heating element being connected in series with each other and with the electromagnetic switch and with the thermostatic switch, and a safety device operable upon a condition of combustion at the burner to cause the current to take a shunt path around the heating element.

12. In a safety control circuit of the character described; a relay having an operating coil therefor; a thermal cut-out having a cut-out switch, a heat-responsive element operable to open said switch, and a heating coil arranged to heat said element to the operating point thereof; thermostatic means for controlling said relay; said operating and heating coils and said switch and said thermostatic means being connected in series; means for impressing an electromotive force on said series; a switch connected across said heating coil, and heat-responsive means operable upon rise in the temperature thereof to a predetermined point to impart closing movement to said second switch and operable at lower temperatures to impart opening movement to the latter.

In witness whereof, we hereto affix our signatures.

HOMER S. ROGERS.
RICHARD RADDATZ.